United States Patent
Sonderegger et al.

(10) Patent No.: US 12,426,736 B2
(45) Date of Patent: Sep. 30, 2025

(54) BEVERAGE PREPARATION APPARATUS AND METHOD

(71) Applicant: EUGSTER / FRISMAG AG, Amriswil (CH)

(72) Inventors: Remo Sonderegger, Tägerwilen (CH); Daniel Fischer, Romanshorn (CH); Tobias Theuer, Hünibach (CH)

(73) Assignee: EUGSTER / FRISMAG AG, Amriswil (CH)

( * ) Notice: Subject to any disclaimer, the term of this patent is extended or adjusted under 35 U.S.C. 154(b) by 879 days.

(21) Appl. No.: 17/634,302

(22) PCT Filed: Aug. 12, 2020

(86) PCT No.: PCT/EP2020/072624
§ 371 (c)(1),
(2) Date: Feb. 10, 2022

(87) PCT Pub. No.: WO2021/028472
PCT Pub. Date: Feb. 18, 2021

(65) Prior Publication Data
US 2022/0338663 A1    Oct. 27, 2022

(30) Foreign Application Priority Data
Aug. 13, 2019   (DE) .................... 10 2019 212 110.1

(51) Int. Cl.
*A47J 31/06*    (2006.01)
*A47J 31/36*    (2006.01)

(52) U.S. Cl.
CPC ....... *A47J 31/0647* (2013.01); *A47J 31/3623* (2013.01)

(58) Field of Classification Search
CPC .......... A47J 31/005; A47J 31/02; A47J 31/20; A47J 31/24; A47J 31/30; A47J 31/132;
(Continued)

(56) References Cited

U.S. PATENT DOCUMENTS

2020/0275796 A1 *   9/2020   Bertonlina .......... A47J 31/3695

FOREIGN PATENT DOCUMENTS

| EP | 2409608 A1 | 1/2012 |
| EP | 3019056 B1 | 8/2018 |

(Continued)

OTHER PUBLICATIONS

International Search Report and Written Opinion, mailed on Oct. 21, 2020 for International Application PCT/EP2020/072624.

*Primary Examiner* — Phuong T Nguyen
(74) *Attorney, Agent, or Firm* — The Dobrusin Law Firm, P.C.

(57) ABSTRACT

The invention relates to a beverage preparation apparatus comprising a housing and brewing apparatus that is arranged in said housing and is intended for extracting a single-serve capsule of a first and a second type, which capsule contains a beverage substrate, wherein: a single-serve capsule of the first type has a greater axial length than a single-serve capsule of the second type; the brewing apparatus comprises a first brewing chamber element and a second brewing chamber element; the first brewing chamber element and the second brewing chamber element can be moved relative to one another along a predefined and substantially horizontal path from a loading position, in which the first brewing chamber element and the second brewing chamber element are mutually spaced apart, into an extraction position, in which the first brewing chamber element and the second brewing chamber element form a substantially closed brewing chamber and in which a brewing process can be carried out; the first brewing chamber element comprises a cavity provided for receiving the single-serve capsule; the cavity is axially delimited by a base element that can be adjusted in the horizontal direction between a starting position and a second position; the cavity has a larger volume in the second position than in the starting position; the first brewing (Continued)

chamber element has a blocking apparatus that can be actuated by the single-serve capsule and/or the second brewing chamber element; the blocking apparatus is provided to block, in the starting position or in the second position, a movement of the base element in the horizontal direction away from the second brewing chamber element.

18 Claims, 9 Drawing Sheets

(58) Field of Classification Search
CPC .......... A47J 31/38; A47J 31/44; A47J 31/446; A47J 31/467; A47J 31/468; A47J 31/605; A47J 31/4407; A47J 31/5253; A47J 31/521; A47J 31/3633; A23F 3/166
USPC ......... 99/280, 281, 282, 283, 284, 287, 292, 99/295, 297, 303, 306, 308, 322
See application file for complete search history.

(56) References Cited

FOREIGN PATENT DOCUMENTS

| | | |
|---|---|---|
| EP | 3076831 B1 | 11/2018 |
| EP | 3076833 B1 | 11/2018 |
| EP | 2906091 B1 | 12/2018 |
| WO | 2014/096121 A1 | 6/2014 |
| WO | 2015/004613 A1 | 1/2015 |
| WO | 2019/077568 A1 | 4/2019 |

* cited by examiner

BEVERAGE PREPARATION APPARATUS AND METHOD

PRIOR ART

The present invention is based on a beverage preparation apparatus having a housing and a brewing apparatus, which is arranged in said housing, for extracting a single-serve capsule, which contains a beverage substance, wherein the brewing apparatus comprises a first brewing chamber element and a second brewing chamber element, wherein the first brewing chamber element and the second brewing chamber element are movable relative to each other along a predetermined and substantially horizontal path from a loading position, in which the first brewing chamber element and the second brewing chamber element are spaced apart from each other, into an extraction position, in which the first brewing chamber element and the second brewing chamber element form a substantially closed brewing chamber and in which a brewing operation can be carried out, wherein the first brewing chamber element comprises a cavity which is provided for receiving the single-serve capsule.

Beverage preparation apparatuses of this type are already well known from the prior art. By means of a brewing apparatus of the beverage preparation apparatus, a liquid which is under pressure, for example water, is caused to flow through single-serve capsules, which contain a beverage substrate, for example ground coffee, tea leaves and/or powdered milk, in order to form a beverage. The single-serve capsules are, for example, substantially frustoconical and are composed of a plastics material and/or aluminum. They have an edge or flange running around an upper opening. A cover film which closes the opening is often sealed onto said edge, as a result of which the raw beverage substance is enclosed in a substantially hermetically sealed manner. For use, the single-serve capsule in the beverage preparation apparatus is pierced on both sides, i.e. at the cover film and the base, in order to enable liquid to pass through it. Since the single-serve capsule is generally manufactured from a comparatively soft material which does not withstand the high water pressure which is used, the single-serve capsule in the beverage preparation apparatus is enclosed in an, in particular liquid-tight, brewing chamber.

Furthermore, it is known to prepare a multiplicity of different beverages using the abovementioned single-serve capsules. In order, for example, also to prepare different quantities of a beverage while maintaining the quality, it is desirable to be able to use single-serve capsules of different volumes in the same beverage preparation apparatus.

For this purpose, the brewing chamber volume has to be adaptable to the volume of the single-serve capsule. Beverage preparation apparatuses have therefore already been proposed which, for example, use single-serve capsules with different edges or flanges, wherein the different edges are identified and the brewing chamber volume adapted, generally by motor. Beverage preparation apparatuses of this type are disclosed, for example, in EP 3 019 056 B1, EP 3 076 831 B1 or EP 3 076 833 B1.

However, it is desirable here also to be able to use single-serve capsules that are substantially identical in the upper region, i.e. in particular have an edge with the same dimensions, but which differ in their axial length and therefore their volume.

Furthermore, EP 2 906 091 B1 has already proposed a beverage preparation machine which has a size detection arrangement which detects the presence of a single-serve capsule and subsequently determines the size of the single-serve capsule, for example visually, magnetically or electrically, whereupon configuration of the brewing chamber can be adapted corresponding to the size. However, such a size detection arrangement is error-prone, complex and therefore costly.

DISCLOSURE OF THE INVENTION

It is therefore an object of the present invention to provide a beverage preparation machine of the type mentioned at the beginning which does not have the aforementioned disadvantages and in particular permits a simple, reliable and mechanical change in volume of the brewing chamber in order to adapt it to different single-serve capsule sizes.

The object of the present invention is achieved by a beverage preparation apparatus having a housing and a brewing apparatus, which is arranged in said housing, for extracting a single-serve capsule, which contains a beverage substrate, of a first type and a second type, wherein a single-serve capsule of the first type has a greater axial length than a single-serve capsule of the second type, wherein the brewing apparatus comprises a first brewing chamber element and a second brewing chamber element, wherein the first brewing chamber element and the second brewing chamber element are movable relative to each other along a predetermined and substantially horizontal path from a loading position, in which the first brewing chamber element and the second brewing chamber element are spaced apart from each other, into an extraction position, in which the first brewing chamber element and the second brewing chamber element form a substantially closed brewing chamber and in which a brewing operation can be carried out, wherein the first brewing chamber element comprises a cavity which is provided for receiving the single-serve capsule, wherein the cavity is delimited axially by a base element which is adjustable along the horizontal direction between a starting position and a second position, wherein the cavity has a greater volume in the second position than in the starting position, wherein the first brewing chamber element has a blocking apparatus which is actuable by the single-serve capsule and/or the second brewing chamber element, wherein the blocking apparatus is provided to block a movement of the base element in the horizontal direction away from the second brewing chamber element in the starting position or in the second position. Substantially horizontally means here in particular horizontally, wherein small and slight deviations from the horizontal direction should not be detrimental as long as they are negligible over the entire movement distance. The brewing apparatus therefore comprises in particular three different positions: a) the brewing apparatus is in the loading position and the base element is in the starting position, b) the brewing apparatus is in the extraction position and the base element in the starting position, and c) the brewing apparatus is in the extraction position and the base element in the second position. Preferably, the first brewing chamber element is provided in a fixed position and the second brewing chamber element so as to be movable. Alternatively, the second brewing chamber element is provided in a fixed position and the first brewing chamber element so as to be movable, or the first and the second brewing chamber element are both provided so as to be movable. The movement of the brewing chamber part or parts particularly preferably takes place manually by a user, for example via a lever which is arranged on the upper side of the beverage preparation apparatus and which is connected to the at least one movable brewing chamber element by means of a suitable mechanism. Alternatively or additionally, the beverage preparation apparatus comprises a motor, in particular an electric motor, which brings about the relative movement.

The beverage preparation apparatus according to the invention has the advantage over the prior art that it provides a purely mechanical and automatic solution for adapting the brewing chamber volume by adapting the volume of the cavity of the first brewing chamber element. Complicated size detection arrangements with sensors are in particular unnecessary. Furthermore, the single-serve capsules can be formed identically in the edge region, i.e. in the region of their opening closed by the cover film, and differ only in respect of their axial length, i.e. in particular in that an increase in size of the single-serve capsule volume is obtained exclusively by an axial extension of the single-serve capsule. Despite the single-serve capsules therefore being identical in the edge region, the brewing chamber volume is adapted in an advantageous manner without error and automatically.

Advantageous refinements and developments of the invention can be gathered from the dependent claims, and from the description with reference to the drawings. The statements associated with this subject matter of the present invention also apply to the further subject matter of the present invention, and vice versa.

The present invention is based on a horizontally oriented brewing apparatus. All direction and position statements are therefore based on such a known arrangement. However, a person skilled in the art understands that the concept according to the invention of the mechanical adaptation of the brewing chamber volume, in particular by the blocking apparatus, is also usable in other brewing apparatuses in other spatial arrangements. In particular, a vertically oriented brewing apparatus is also conceivable, in which the single-serve capsule is, for example, introduced horizontally, and in which the first and the second brewing chamber element are movable relative to each other along a substantially vertical direction. The blocking apparatus according to the invention is also usable in such an embodiment.

Single-serve capsules of the first and the second type preferably have a basic element with a cavity for receiving a raw beverage material, and a cover film closing the cavity, wherein the cover film is fastened to an encircling flange of the basic element. A sealing element is particularly preferably provided on a lower side of the flange facing away from the cover film. The sealing element serves in particular for sealing the brewing chamber by interaction of the sealing element with the first brewing chamber element. Very particularly preferably, the single-serve capsules are formed in a rotationally symmetrical manner with respect to an axial axis. The single-serve capsules are preferably frustoconical or cylindrical. In a preferred embodiment, the single-serve capsules, in particular the basic element, comprise aluminum. In an alternative embodiment, the single-serve capsules, in particular the basic element, comprise a plastic. The cavity formed by the basic element serves for receiving raw beverage material, for example roasted coffee granules, instant coffee, chocolate powder, tea blends, powdered milk or the like. Alternatively or additionally to plastic or aluminum, the single-serve capsules comprise a biologically degradable material or any combination of these materials. Very particularly preferably, the single-serve capsules of the first and of the second type have a different volume, wherein in particular the flange is identical in its dimensions for both types. The different volume is therefore produced in particular merely by the different length of the single-serve capsules.

The base element preferably has an encircling sealing element, in particular an annular sealing element, which particularly preferably interacts in a sealing manner with the inner wall of the brewing chamber. It is therefore advantageously ensured that, despite the movable base element, the brewing chamber is tightly closed in the extraction position such that neither the liquid conducted through the single-serve capsule nor the finished beverage can run out of the brewing chamber into the beverage preparation apparatus.

According to a preferred embodiment of the present invention, it is provided that the blocking apparatus comprises at least one first locking means which is rotatable about an axis oriented perpendicularly to the horizontal direction and in particular vertically, wherein a movement of the first locking means is blockable in the starting position and in the second position, wherein the first locking means in each case has a contact surface for the base element in the starting position and in the second position, wherein the contact surface in the starting position is in particular different from the contact surface in the second position, wherein preferably the main plane of extent of the first locking means encloses an angle of 45° to the horizontal in the starting position and/or encloses an angle of 90° to the horizontal in the second position. In a particularly advantageous manner, a structurally simply configured means is therefore provided for securing, i.e. blocking, the base element in the two positions. In this case, in particular a movement in the side facing away from the second brewing chamber element is blocked, i.e. the base element enters into contact with a contact surface of the first locking means, the position of which is fixed, as a result of which a further movement of the base element is prevented. The first locking means rotates here between two positions, in particular a position in which it encloses an angle of 45° with the horizontal direction, and a position in which it encloses an angle of 90° with the horizontal direction, wherein, in the positions, the forces acting on the first brewing chamber element, in particular the base element, by the single-serve capsule, the liquid conducted through the latter, and/or the second brewing chamber element are dissipated via the contact surfaces. At the end remote from the rotation axis, the first locking means preferably has at least two surfaces which butt against each other at an angle, the angle in particular being 90°. The first locking means particularly preferably has at least one, in particular two, contact regions, in which, in the starting position, contact takes place between the first locking means and the base element and/or the second locking means. Specifically by the provision of a plurality of contact regions, the forces which are in action can advantageously be better dissipated and the stability of the beverage preparation apparatus according to the invention can therefore be increased.

According to a preferred embodiment of the present invention, it is provided that the blocking apparatus has two first locking means which are arranged in particular mirror-symmetrically to a plane which is arranged between the first locking means and is parallel to the horizontal direction. By this means, the safety is further increased in a particularly advantageous manner since the forces are dissipated symmetrically to both sides of the base element.

According to a preferred embodiment of the present invention, it is provided that the first brewing chamber element has at least one second locking means, wherein the second locking means is provided so as to be movable horizontally along a predetermined path, wherein, when a single-serve capsule of the second type is used, the second locking means is provided so as to interact with the first locking means in such a manner that it blocks the first locking means in the starting position, wherein the second brewing chamber element preferably has at least one holding means for holding and guiding the single-serve capsule, wherein the second locking means is actuable by the second brewing chamber element and in particular by the holding means. An associated second locking means is preferably provided for each first locking means. The second locking means is particularly preferably elongate in the horizontal direction, wherein the second locking means is in particular substantially pin- or rod-shaped. Very particularly preferably, the first locking means has a third contact surface which is provided for contact with the second locking means. It is particularly advantageously ensured by the second locking means that, when a single-serve capsule of the second type is used, rotation of the first locking means is prevented, as a result of which a movement of the base element is blocked and the latter is secured in the starting position.

According to a preferred embodiment of the present invention, it is provided that when a single-serve capsule of the first type is used, the first locking means is provided so as to interact with the base element in such a manner that the first locking means is brought from the starting position into the second position, wherein the first locking means is blocked in the second position preferably by the housing, the first brewing chamber element, the base element and/or the second locking means.

In particular, the brewing apparatus is designed in such a manner that, depending on the type of single-serve capsule used, either, when a longer or larger single-serve capsule is used, the single-serve capsule first of all moves the base element, as a result of which the first locking means is pivoted 90° relative to the horizontal direction, in which it lies fixedly on the first brewing chamber element and/or the housing, or, when a shorter or smaller single-serve capsule is used, the holding means first of all moves the second locking means in such a manner that it blocks the rotation of the first locking means, as a result of which, in turn, the base element is blocked. In a particularly advantageous manner, a purely mechanical solution is therefore implemented which automatically sets the correct brewing chamber volume on the basis of the size of the single-serve capsule. It is very particularly advantageous here that, with the base element, the first and the second locking means, basically only three movable elements are used which also carry out only simple movements (translation or rotation), as a result of which the susceptibility to error is reduced and the maintenance periods extended.

According to a preferred embodiment of the present invention, it is provided that the first locking means is prestressed in the direction of the base element by a first restoring means, in particular a leaf spring, in that the second locking means is prestressed in the direction of the second brewing chamber element by a second restoring means, in particular a spiral spring, and/or in that the base element is prestressed in the direction of the starting position by a third restoring means, in particular a spiral spring. By this means, in an advantageous manner, when the brewing chamber is opened, i.e. when the brewing apparatus is brought from the extraction position into the loading position, the brewing apparatus is automatically brought again to the starting position.

According to a preferred embodiment of the present invention, it is provided that the blocking apparatus, in particular the second locking means, has an adjustment means. The adjustment means is particularly preferably a screw. Very particularly preferably, the screw is arranged at the end of the second locking means that faces the second brewing chamber element. By this means, an adjustment means which is adjustable simply and manually is advantageously provided. By screwing the screw in or unscrewing the screw, contact with the holding means takes place later or earlier, and therefore the blocking of the first locking means by the second locking means is controllable. By this means, in particular the automatic adjustment of the brewing chamber volume is controllable, for example depending on the volume of the single-serve capsules to be used.

A further subject matter of the present invention is a system for preparing a beverage comprising a beverage preparation apparatus according to the invention and a single-serve capsule set comprising at least one single-serve capsule of a first type and at least one single-serve capsule of a second type, wherein a single-serve capsule of the first type has a greater axial length than a single-serve capsule of the second type.

The system according to the invention advantageously permits greater flexibility and a greater variety of possible types of beverage since single-serve capsules with different volumes can also be used. The beverage preparation apparatus is provided here in a particularly advantageous manner such that it permits an automatic and in particular purely mechanical adaptation of the brewing chamber volume to the volume of the single-serve capsule.

The statements associated with this subject matter of the present invention also apply to the further subject matter of the present invention, and vice versa.

A further subject matter of the present invention is a method for preparing a beverage using a single-serve capsule, which contains a beverage substrate, of a first type or a second type, wherein a single-serve capsule of the first type has a greater axial length than a single-serve capsule of the second type, in a beverage preparation apparatus having a housing and a brewing apparatus, which is arranged in said housing, for extracting a single-serve capsule, which contains a beverage substrate, of the first type and the second type, wherein the brewing apparatus comprises a first brewing chamber element and a second brewing chamber element, wherein the first brewing chamber element and the second brewing chamber element are movable relative to each other along a predetermined and substantially horizontal path from a loading position, in which the first brewing chamber element and the second brewing chamber element are spaced apart from each other, into an extraction position, in which the first brewing chamber element and the second brewing chamber element form a substantially closed brewing chamber and in which a brewing operation can be carried out, wherein the first brewing chamber element comprises a cavity which is provided for receiving the single-serve capsule, wherein the cavity is delimited axially by a base element which is adjustable along the horizontal direction between a starting position and a second position, wherein the cavity has a greater volume in the second position than in the starting position, wherein the first brewing chamber element has a blocking apparatus which is actuable by the single-serve capsule and/or the second brewing chamber element, wherein the blocking apparatus is provided to block a movement of the base element in the horizontal direction away from the second brewing chamber element in the starting position or in the second position, wherein, in the loading position, the single-serve capsule is introduced into the beverage preparation apparatus, wherein the brewing apparatus is transferred into the extraction position, wherein when a single-serve capsule of the first type is used, the base element is transferred by the single-serve capsule from the starting position into the second position, and the movement of the base element in the horizontal direction is blocked in the second position, when a single-serve capsule of the second type is used, the blocking apparatus is actuated by the second brewing chamber element, and in particular by a holding means for holding and guiding the single-serve capsule, in such a manner that the movement of the base element from the starting position into the second position is blocked, wherein, in the extraction position, a liquid is conducted preferably under pressure through the single-serve capsule, wherein the finished beverage is discharged through the base element and output through an outlet opening.

The method according to the invention has the advantage that the brewing chamber volume is mechanically adapted automatically by displacement of the base element depending on the volume of the single-serve capsule used. So that the brewing chamber maintains the correct volume during the extraction operation, the blocking apparatus blocks a further movement in the respective position.

The statements associated with this subject matter of the present invention also apply to the further subject matter of the present invention, and vice versa.

According to a preferred embodiment of the method according to the invention, it is provided that, when the single-serve capsule of the second type is used, the holding means actuates a second locking means which blocks the first locking means in the starting position. This makes it possible, in a particularly advantageous manner, for the holding means to bring about the blocking of the first locking means before a possible movement of the base element.

Further details, features and advantages of the invention emerge from the drawings and from the description below of preferred embodiments with reference to the drawings. The drawings illustrate merely exemplary embodiments of the invention that do not restrict the essential inventive concept.

EMBODIMENTS OF THE INVENTION

Figure 1:
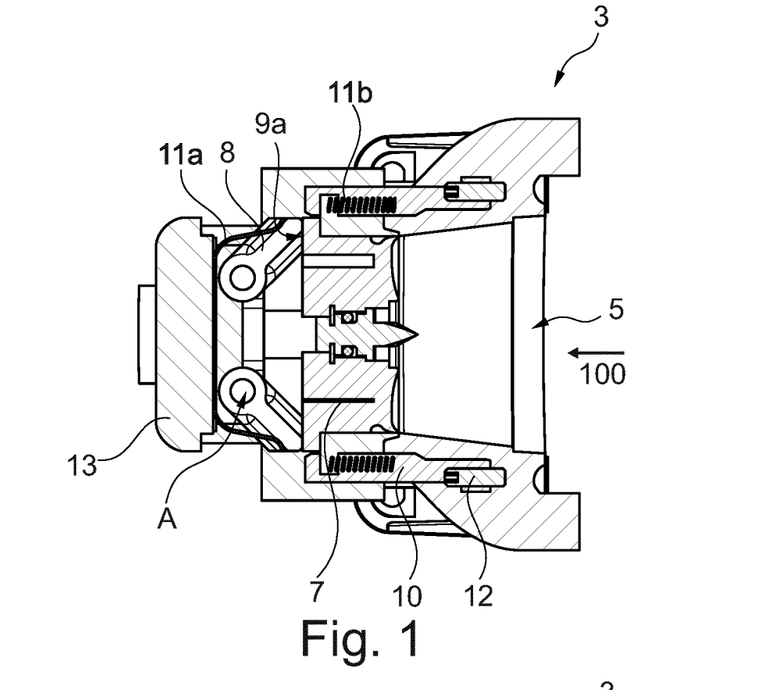
FIG. 1 shows a schematic sectional view of a possible embodiment of a first brewing chamber element according to the invention.

FIG. 1 illustrates a schematic sectional view of a possible embodiment of a first brewing chamber element 3 according to the invention. Such a first brewing chamber element 3 is part of a brewing apparatus 1 which, in turn, is part of a beverage preparation apparatus according to the invention. Such a beverage preparation apparatus uses single-serve capsules 2a, 2b containing a raw beverage material, for example tea leaves, ground and roasted coffee and/or powdered milk, in order to prepare a beverage.

A single-serve capsule 2a, 2b of this type consists of a preferably frustoconical basic element which has in particular an encircling side wall and a base formed integrally therewith. These surround a cavity in the single-serve capsule 2a, 2b, in which the raw beverage material and optionally further elements, such as, for example, filters, water distributers, support elements or the like, are arranged. Opposite the base, the single-serve capsule 2a, 2b has an opening which is closed as a rule by a cover film, wherein the cover film is preferably fastened, for example sealed, in the plane of the opening to an encircling flange. A single-serve capsule 2a, 2b of this type is preferably formed rotationally symmetrically with respect to an axis running centrally through the single-serve capsule.

Within the context of the present invention, at least two different types of single-serve capsules 2a, 2b will now be considered, wherein a single-serve capsule of a first type 2a differs from a single-serve capsule of a second type 2b to the effect that it has a greater axial length. The two types of single-serve capsules 2a, 2b preferably differ only in respect of their axial length; they are therefore formed identically in particular in the region of their opening and with respect to the flanges. The different axial length means that they comprise different volumes, wherein the single-serve capsule of the first type 2a has a greater volume than the single-serve capsule of the second type 2b and can therefore contain a greater quantity of raw beverage material. It is thereby possible to produce, for example, a greater volume of the beverage (with concentration or strength remaining unchanged), or, for example in the case of coffee, to produce a beverage with a higher concentration or strength with the same volume of liquid.

For this purpose, a desired single-serve capsule 2a, 2b is introduced into the beverage preparation apparatus between a first brewing chamber element 3 and a second brewing chamber element 4, for example is supplied via an input shaft in a housing of the beverage preparation apparatus, wherein the first brewing chamber element 3 and the second brewing chamber element 4 are spaced apart from each other in a loading position. The second brewing chamber element 4 comprises a holding means 6, for example two arms which are arranged on both sides of the single-serve capsule 2a, 2b and which grasp the single-serve capsule 2a, 2b and hold it securely in the horizontal position and guide it on the path from the loading position into the extraction position. A relative movement of the two brewing chamber elements 3, 4 is subsequently brought about, wherein either the two brewing chamber elements 3, 4 are movable successively or simultaneously toward each other, or, alternatively, one of the brewing chamber elements 3, 4 can be arranged in a fixed position in the housing of the beverage preparation apparatus, wherein, in this case, the respective other brewing chamber element 4, 3 is moved toward the positionally fixed brewing chamber element 3, 4.

Within the scope of the embodiments presented here, a variant is described, in which the first brewing chamber element 3 is arranged in a fixed position within the housing and the second brewing chamber element 4 is moved together with the single-serve capsule 2a, 2b toward the first brewing chamber element 3. However, this does not restrict the subject matter of the present invention to said variant, but rather serves merely for simpler explanation of the principle according to the invention.

In the closed state, the first brewing chamber element 3 and the second brewing chamber element 4 form a preferably liquid-tight brewing chamber, in which the single-serve capsule 2a, 2b is received. Since single-serve capsules 2a, 2b of this type are frequently thermoformed from a plastics film, they do not withstand the liquid pressures generally used in the beverage preparation apparatuses, and there is the risk of the single-serve capsules 2a, 2b bursting. For this reason, they are introduced into the cavity 5 of the brewing chamber, the inner walls of which cavity correspond to the shape of the single-serve capsule 2a, 2b such that the walls thereof are supported in the brewing chamber during expansion. If the brewing chamber is closed, the brewing apparatus is in the extraction position. In the latter, the two sides, i.e. the cover film and the base, are preferably pierced in order to create a liquid path. Subsequently, a liquid, for example water, is pumped in particular under pressure through the single-serve capsule 2b where it interacts with the raw beverage material and forms a beverage which is guided out of the beverage preparation apparatus through a rear, here left, end of the cavity 5.

In a known manner, beverage preparation machines of this type conventionally comprise a liquid reservoir, a pump element and preferably a heating element, in order to heat the liquid, this being required, for example, for hot beverages, such as coffee, drinking chocolate, etc.

Since the brewing chamber is adapted to a certain type of single-serve capsule 2b, as can also be seen by way of the cavity 5 in FIG. 1, the size, i.e. the volume, of the cavity 5 has to be adapted when a different, in this case more voluminous, single-serve capsule 2a is used. For this purpose, a base element 7 is now provided according to the invention, said base element closing the cavity 5 at the end of the cavity 5 opposite the second brewing chamber element 4. The base element 7 preferably comprises an encircling sealing element in order to provide a liquid-tight seal with the inner wall of the cavity 5.

The base element 7 particularly preferably comprises at least one, in particular centrally arranged, piercing element, and drainage means for discharging the finished beverage. Furthermore, the base element 7 is now provided movably within the first brewing chamber element 3, wherein it can preferably move only in one direction, here the horizontal direction 100, i.e. from right to left in the figures. By shifting of the base element 7 to the left, the volume of the cavity 5 is automatically increased. The first brewing chamber element 3 preferably comprises a restoring means 11c, for example a spiral spring, in order to prestress the base element 7 in the direction of its starting position which is illustrated in FIG. 1.

According to the embodiment illustrated here, the beverage preparation apparatus is suitable for the use of two different types of single-serve capsules 2a, 2b since the base element 7 can take up two defined positions, the starting position and a second position. As already explained, it is crucial for the base element 7 to be fixed in both positions in order to provide a pressure-proof cavity 5 which is adapted to the respective single-serve capsule 2a, 2b.

According to the invention, the first brewing chamber element 3 comprises for this purpose a blocking apparatus which is provided in particular purely mechanically, i.e. the blocking apparatus is actuated purely mechanically and the adjustment mechanism is purely mechanical. Said blocking apparatus above all comprises a first locking means 8. The latter is designed here to be substantially pointer-shaped in the sectional illustration, i.e. it is provided to be rotatable about an axis A, which is oriented perpendicularly to the horizontal direction 100 and is provided in particular vertically, and, at its end remote from the rotation axis A, is provided tapered at a 90° angle, i.e. it has two surfaces which butt against each other at a 90° angle.

According to the embodiment which is illustrated, the first brewing chamber element 3 is mirror-symmetrical with respect to a horizontal central plane, i.e. two identical first locking means 8 which are rotated in opposite directions are provided. Here, the first brewing chamber element 3 is illustrated in the loading position and therefore the base element 7 and the first locking means 8 are illustrated in a starting position. In the latter, the base element 7 lies on contact surfaces 9a of the first locking means 8, i.e. is supported by the first locking means 8. The first brewing chamber element 3 here comprises a restoring means 11a, preferably a leaf spring, pressing the first locking means 8 against the base element 7. To the side of the cavity 5, the first brewing chamber element 3 furthermore comprises two likewise symmetrically arranged second locking means 10, the functioning of which will be explained in conjunction with the following figures.

Said second locking means 10 are elongate in the horizontal direction 100 and are arranged in such a manner that they can be actuated by the holding means 6 of the second brewing chamber element 4 and moved in the horizontal direction 100. The second locking means 10 are also prestressed into the starting position by restoring means 11b, here spiral springs. In the loading position, the base element 7, the first locking means 8 and the second locking means 10 can be moved counter to the force of the restoring means 11a, 11b, 11c, i.e. none of the elements is blocked in the loading position.

According to the embodiment which is illustrated, adjustment means 12 in the form of screws are arranged at the ends of the second locking means 10 that face the second brewing chamber element 4, the adjustment means being able to be used to manually adjust the distance between the second locking means 10 and the holding means 6 and therefore the sensitivity of the brewing apparatus to a change from the starting position into the second position.

On the rear side of the first brewing chamber element 3, a cover element 13 is provided which is connected fixedly to the first brewing chamber element 3 and provides a fixed contact surface for the first locking means 8 in the second position.

Figure 2:
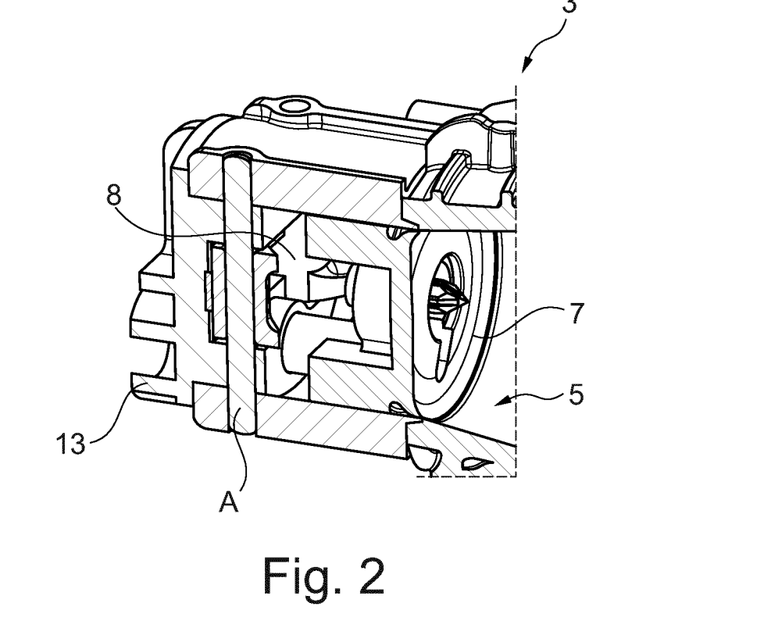
FIG. 2 shows a perspective sectional view of a possible embodiment of the first brewing chamber element according to the invention.

FIG. 2 illustrates a perspective sectional view of a possible embodiment of the first brewing chamber element 3 according to the invention. The embodiment shown here substantially corresponds to the embodiment explained in conjunction with FIG. 1, and therefore reference is made to the statements in this regard. The axles A about which the first locking means 8 rotate can clearly be seen in FIG. 2. Said axles pass through the entire first brewing chamber element 3 and therefore provide a secure support and good force transmission. Furthermore, it can be seen that the first locking means 8 have an elongate extent parallel to the axle A.

Figure 3:
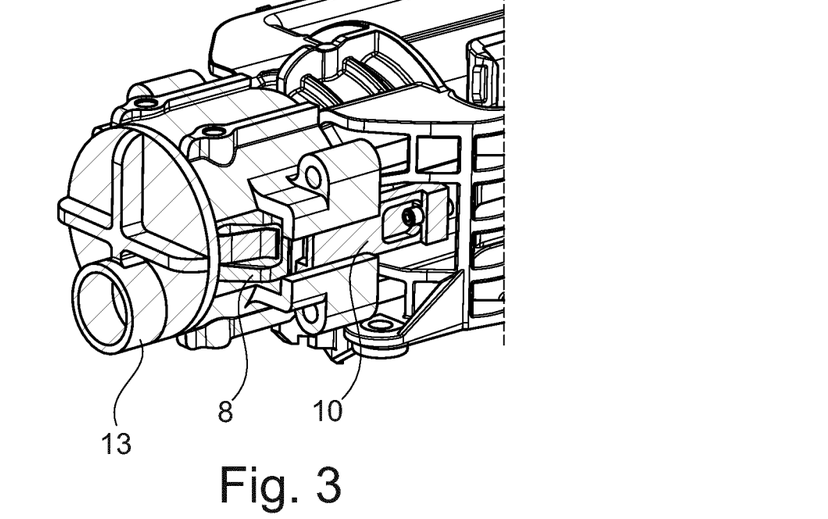
FIG. 3 shows a further perspective view of a possible embodiment of the first brewing chamber element according to the invention.

FIG. 3 illustrates a further perspective view of a possible embodiment of the first brewing chamber element 3 according to the invention. This embodiment also substantially corresponds to the embodiments already described previously. It can be seen from this rear view that, despite the automatic and mechanical adaptation of the brewing chamber volume, the first brewing chamber element 3 as before has a compact shape, and therefore the beverage preparation apparatus according to the invention is space-saving. Furthermore, it can be seen how the adjustment means 12, here the screws, are easily accessible such that the brewing apparatus can be calibrated in a simple manner by a technician and optionally also by a user.

Figure 4:
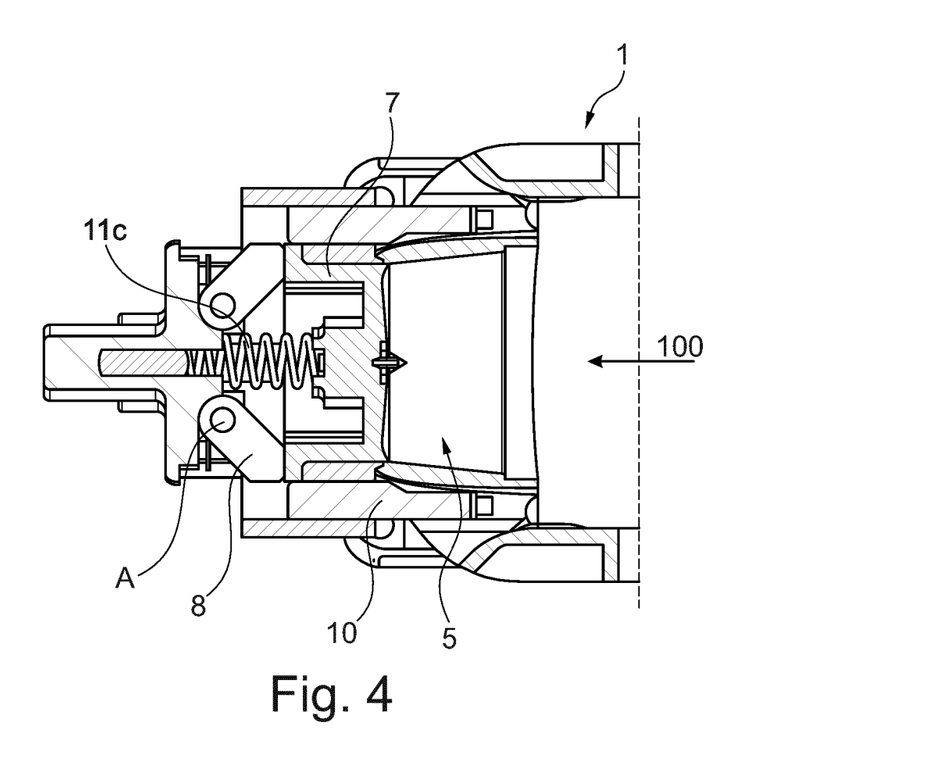
FIG. 4 shows a schematic view of a possible embodiment of a first brewing chamber element according to the invention in the starting position.

FIG. 4 illustrates a schematic view of a possible embodiment of a first brewing chamber element 3 according to the invention in the starting position. The brewing apparatus here is in the extraction position, and therefore this illustration substantially corresponds to the illustration from FIG. 1. Reference is made to the statements in this regard. The restoring means 11c for prestressing the base element 7 into the starting position, here a spiral spring, can be seen here. It can clearly be seen in this view that, in the loading position, the first locking means 8 and the second locking means 10 are spaced apart from each other in such a manner that they do not touch each other. In this position, apart from the resistance by the restoring means 11a, the first locking means 8 rotate freely upward and downward in the plane of the image, i.e. into a position in which they enclose an angle of 90° with the horizontal direction 100.

The base element 7 is in turn displaceable in the horizontal direction 100, which brings about the abovementioned rotation of the first locking means 8. The second locking means 10, again apart from the forces exerted on them by the restoring means 11b, are movable freely in the horizontal direction 100 in the loading position.

Figure 5:
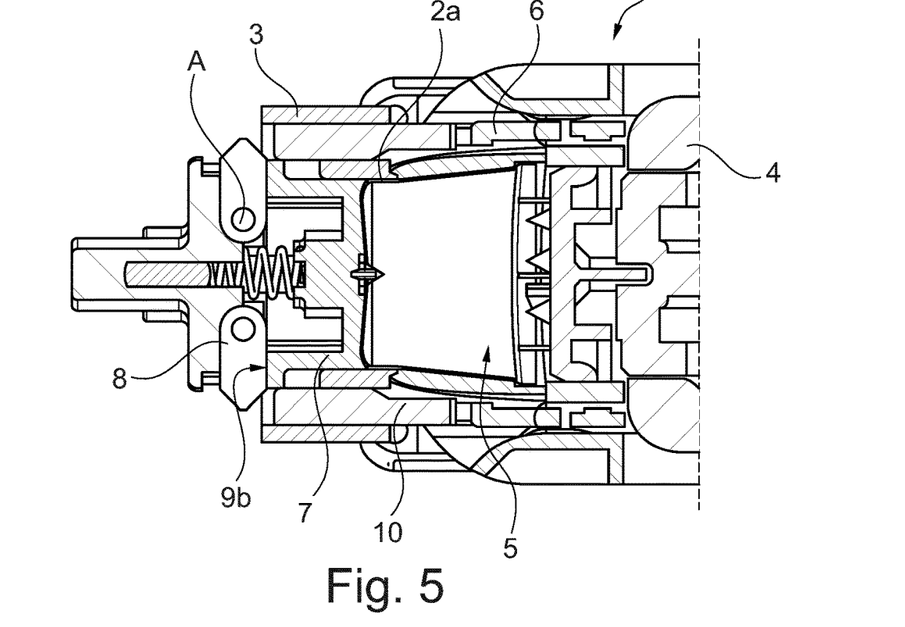
FIG. 5 shows a schematic view of a possible embodiment of a brewing apparatus according to the invention in the extraction position when a single-serve capsule of the first type is used.

FIG. 5 now illustrates a schematic view of a possible embodiment of a brewing apparatus 1 according to the invention in the extraction position when a single-serve capsule of the first type 2a is used. The first brewing chamber element 3 and the second brewing chamber element 4 are closed and form a brewing chamber in which a single-serve capsule of the first type 2a is enclosed. The base element 7 has been displaced in the horizontal direction 100 by the base of the single-serve capsule 2a. By means of the movement of the base element 7, the first locking means 8 are rotated about the axle A and now lie flat on the rear cover element 13. The base element 7 is supported on contact surfaces 9b on the long sides of the first locking means 8. A further movement of the base element 7 in the horizontal direction 100 is therefore not possible, and the base element is blocked in the second position, on one side by the first locking means 8, and on the other side by the single-serve capsule 2a. When the brewing chamber is closed, the holding means 6 finally make contact with the second locking means 10 and likewise displace the latter in the horizontal direction 100. For the extraction of a single-serve capsule of the first type 2a, the brewing apparatus is therefore brought into the extraction position, wherein the base element 7 and the first locking means 8 are moved into the second position.

Figure 6:
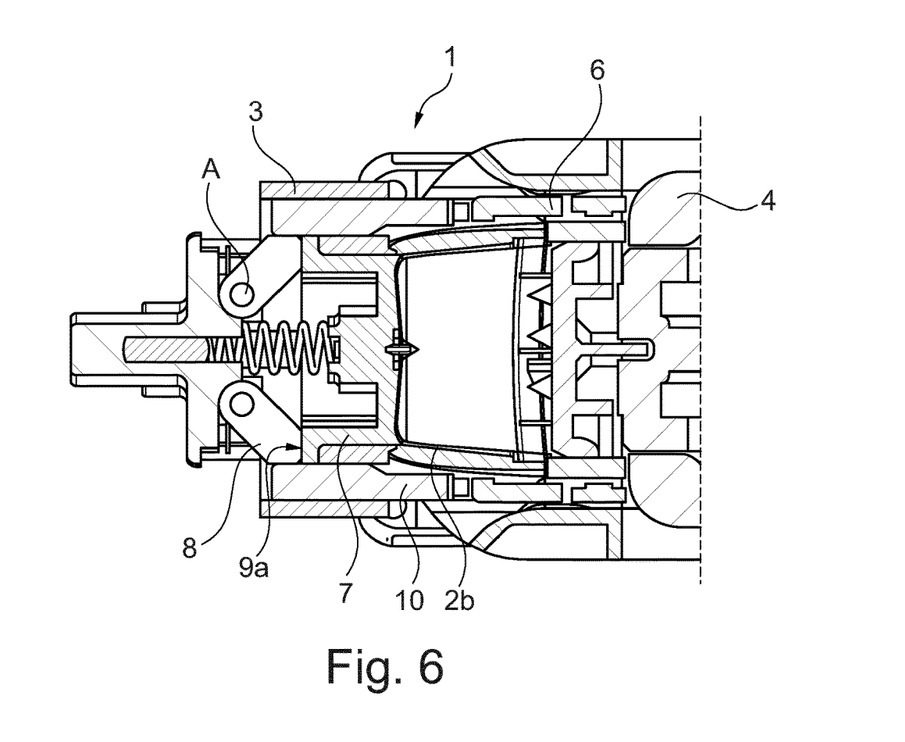
FIG. 6 shows a schematic view of a possible embodiment of a brewing apparatus according to the invention in the extraction position when a single-serve capsule of the second type is used.

FIG. 6 illustrates a schematic view of a possible embodiment of a brewing apparatus 1 according to the invention in the extraction position when a single-serve capsule of the second type 2b is used. Since the single-serve capsule of the second type 2b has a smaller axial length than the single-serve capsule of the first type 2a, when the brewing chamber is closed, first of all the second locking means are displaced in the horizontal direction 100 by contact with the holding means 6. Since, in the starting position, the cavity is already adapted to the single-serve capsule of the second type 2b, no movement of the base element 7 takes place. The rotation of the first locking means 8 is blocked by contact of the second locking means 10 with the first locking means 8 on corresponding contact surfaces 9c such that the first locking means 8 are blocked in the starting position. The base element 7 therefore cannot be moved in the horizontal direction 100 even under the pressure of the liquid injected into the single-serve capsule 2b. The brewing apparatus 1 is therefore in a securely locked extraction position, wherein the base element 7 and the first locking means 8 are in the starting position.

Irrespective of the type of single-serve capsules 2a, 2b used, the second locking means 10 are always moved by the second brewing chamber element 4 and in particular by the holding means 6 for holding and guiding the single-serve capsules into the second position in which they are pushed in the horizontal direction 100 into the first brewing chamber element 3. The sole crucial factor for the configuration of the cavity 5, i.e. for the matter of whether the cavity 5 is adapted in terms of volume to the first type 2a or to the second type 2b of single-serve capsule is therefore the sequence in which the elements of the blocking apparatus are actuated, therefore in particular whether first of all the first locking means 8 or the second locking means 10 are actuated.

Figure 7A:
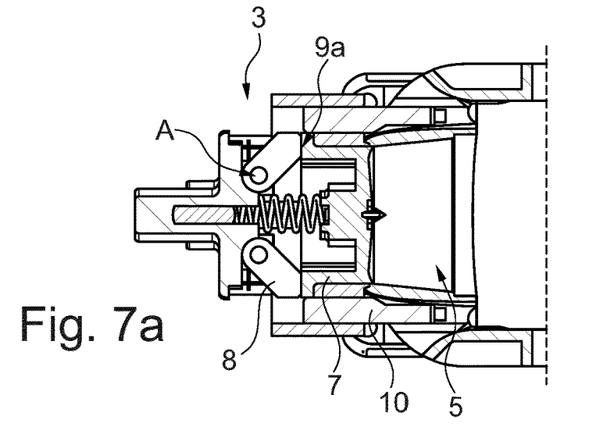
FIGS. 7a-7c show schematic views of a possible embodiment of the method according to the invention when a single-serve capsule of the second type is used, in a plurality of consecutive steps.
Figure 7B:
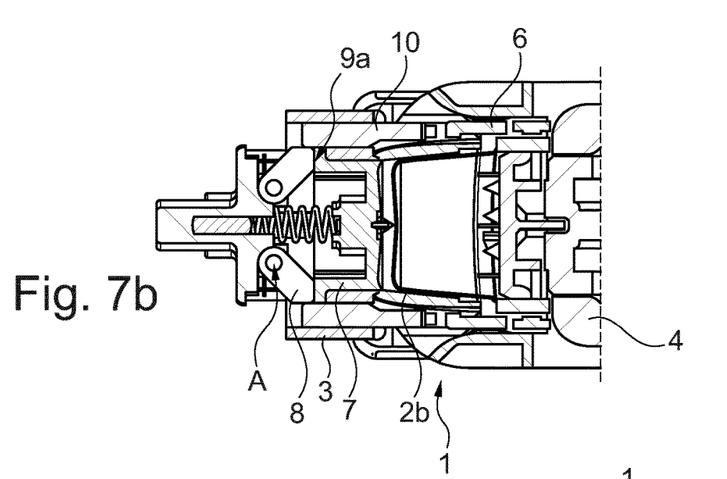
Figure 7C:
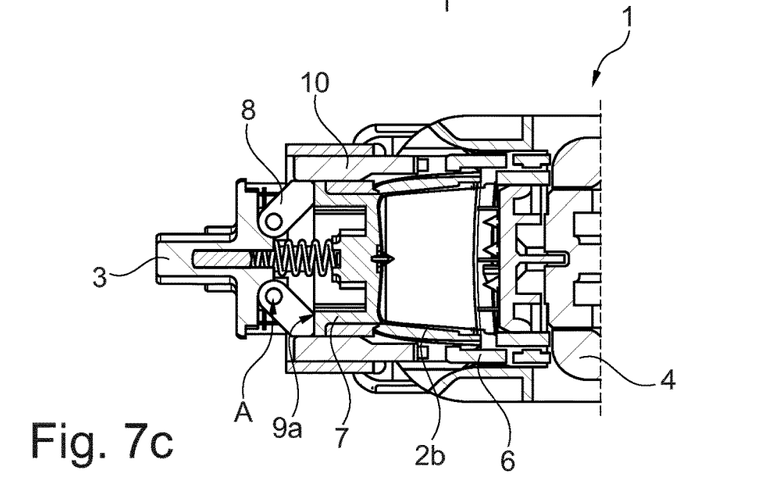

FIGS. 7a-7c illustrate schematic views of a possible embodiment of the method according to the invention during use of a single-serve capsule of the second type 2b, in a plurality of consecutive steps. In this case, FIG. 7a corresponds to the illustration in FIG. 4, and therefore reference is made in this regard to the embodiments there. In the same manner, the illustration in FIG. 7c corresponds to that in FIG. 6, and therefore reference is also made here to the corresponding statements above.

FIG. 7b corresponds to an intermediate position between the loading position and the extraction position, which clarifies the mechanism according to the invention. It can be seen here that the single-serve capsule 2b still does not make contact with the base element 7 because of its smaller axial length, while the holding means 6 have already pushed the second locking means 10 into the first brewing chamber element 3 such that they already block a rotation of the first locking means 8. As already explained previously, the adjustment means 12 can be used to adjust how early the actuation of the second locking means 10 is triggered.

Figure 8A:
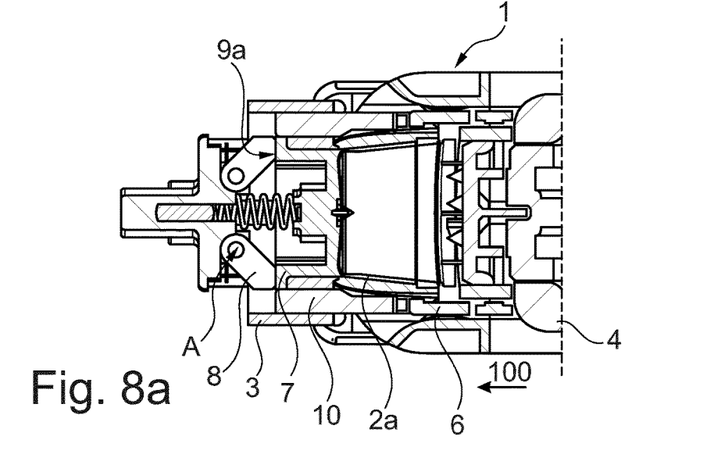
FIGS. 8a-8c show schematic views of a possible embodiment of the method according to the invention when a single-serve capsule of the first type is used, in a plurality of consecutive steps.
Figure 8B:
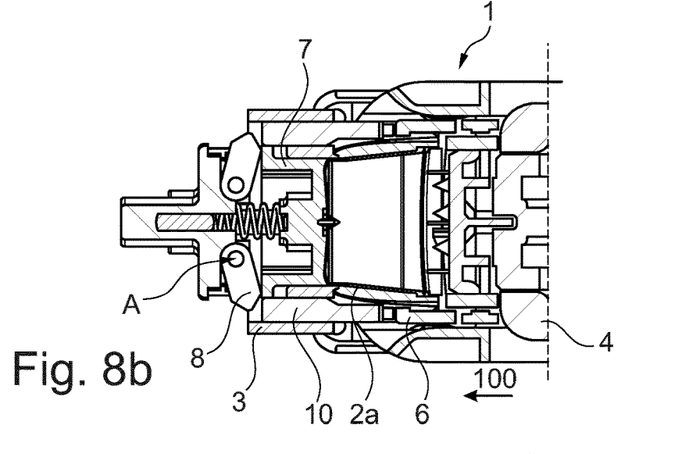
Figure 8C:
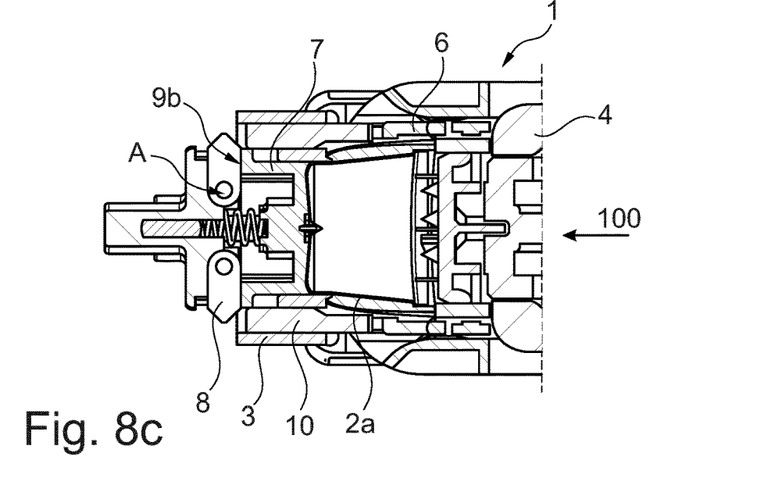

FIGS. 8a-8c illustrate schematic views of a possible embodiment of the method according to the invention during use of a single-serve capsule of the first type 2a, in a plurality of consecutive steps. In this case, FIG. 8a corresponds to the illustration in FIG. 4, and therefore reference is made in this regard to the statements there. In the same manner, the illustration in FIG. 8c corresponds to that in FIG. 5, and therefore reference is also made here to the corresponding statements above.

Analogously to FIG. 7b, FIG. 8b shows an intermediate position between the loading position and the extraction position. The axially longer single-serve capsule of the first type 2a has already displaced the base element 7 by part of the distance into the second position, as a result of which, in turn, the rotation of the first locking means 8 has been triggered. They are now already rotated to such an extent that the second locking means 10 can now no longer block them in the starting position. On the contrary, it is conceivable that the second locking means are designed in such a manner that, in the second position, they additionally arrest or block the first locking means 8 in the second position.

Figure 9A:
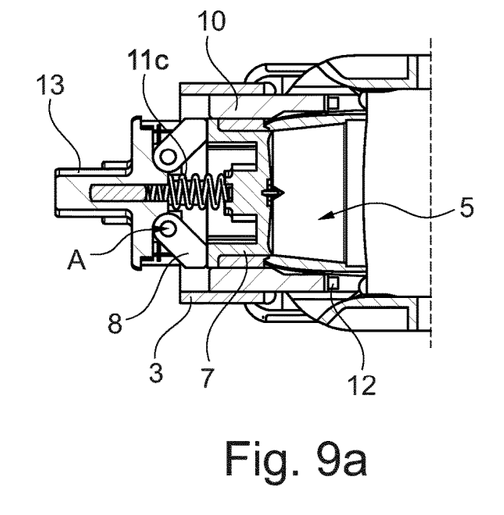
FIGS. 9a-9d show a possible embodiment of the brewing apparatus according to the invention during the transition from the loading position into the extraction position when a single-serve capsule of the second type is used, in a plurality of consecutive steps.
Figure 9B:
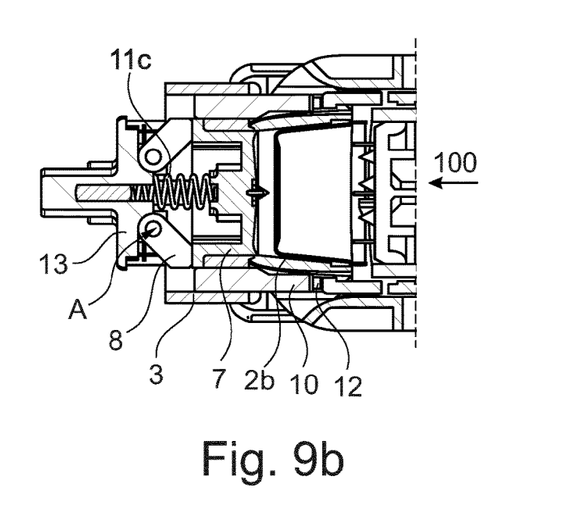
Figure 9C:
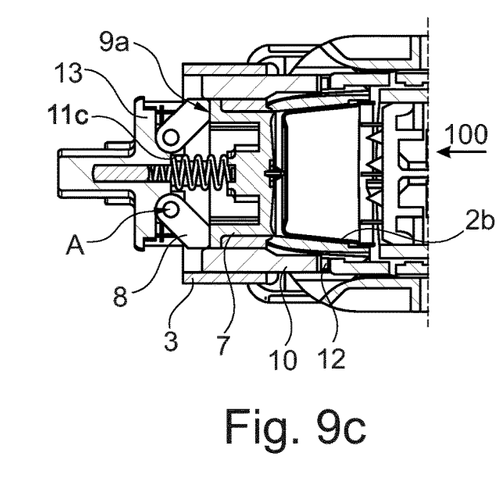
Figure 9D:
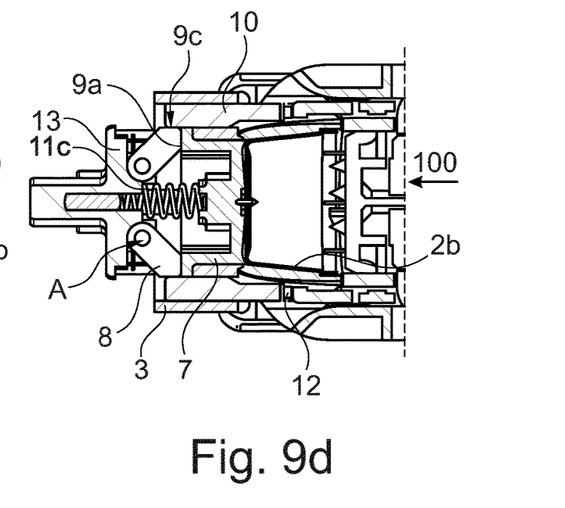

FIGS. 9a-9d illustrate a possible embodiment of the brewing apparatus 1 according to the invention during the transition from the loading position into the extraction position during use of a single-serve capsule of the second type 2b, in a plurality of consecutive steps. In this case, the embodiment which is illustrated substantially corresponds to the embodiment explained in conjunction with FIGS. 7a-7c, but here two intermediate steps are shown (FIGS. 9b and 9c). In these illustrations, in particular the restoring means 11c and the adjustment means 12 can be seen better. Furthermore, the piercing means of the second brewing chamber element 4 can readily be seen, the piercing means piercing the cover film of the single-serve capsule 2b so that the liquid can be conducted through the single-serve capsule 2b.

Figure 10A:
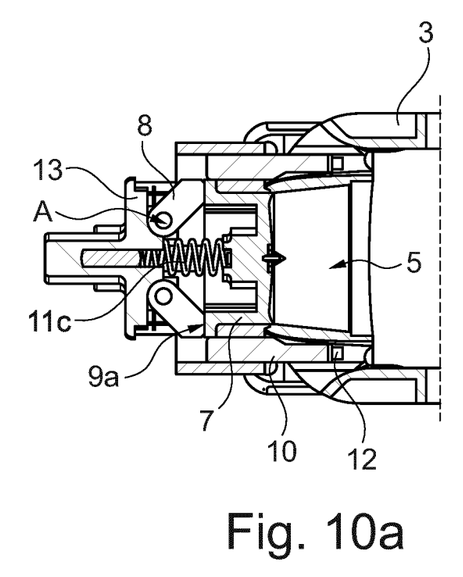
FIGS. 10a-10d show a possible embodiment of the brewing apparatus according to the invention during the transition from the loading position into the extraction position when a single-serve capsule of the first type is used, in a plurality of consecutive steps.
Figure 10B:
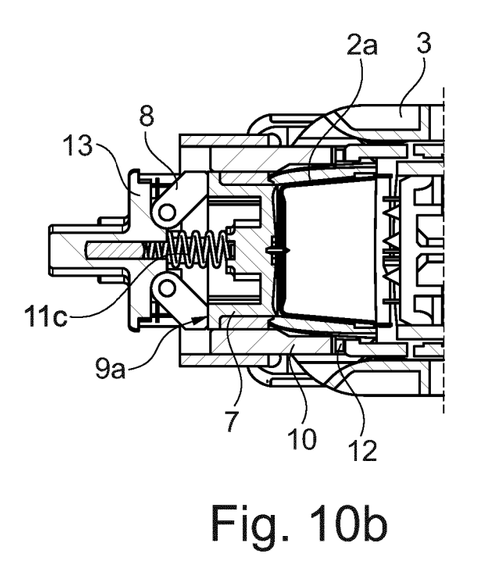
Figure 10C:
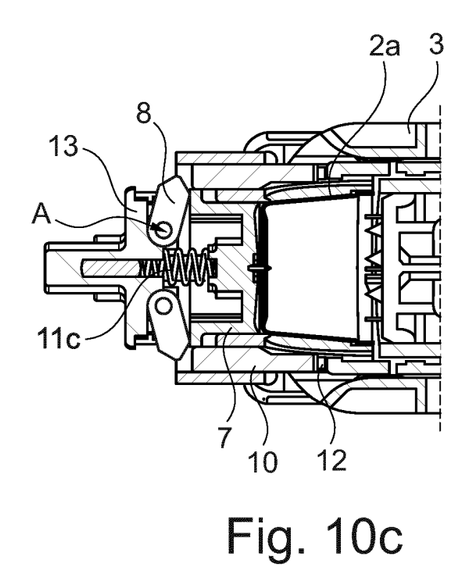
Figure 10D:
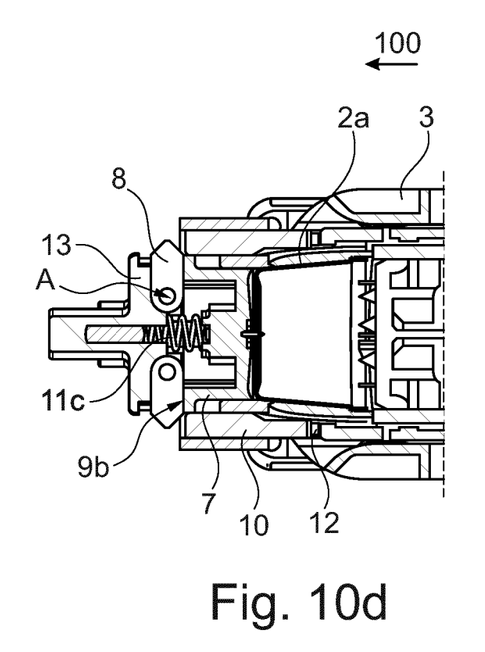

FIGS. 10a-10d illustrate a possible embodiment of the brewing apparatus 1 according to the invention during the transition from the loading position into the extraction position during use of a single-serve capsule of the first type 2a, in a plurality of consecutive steps. In this case, the embodiment which is illustrated substantially corresponds to the embodiment explained in conjunction with FIGS. 8a-8c, but here two intermediate steps are shown (FIGS. 10b and 10c). In these illustrations, in particular the restoring means 11c and the adjustment means 12 can be better seen.

In particular, it can be seen by comparing FIGS. 9b and 10b how the adaptation according to the invention of the brewing chamber volume to the volume of the single-serve capsule takes place. Both figures illustrate the moment at which the holding means 6 touch the second locking means 10 for the first time. The brewing chamber is not yet completely closed here. While, in FIG. 9b, the single-serve capsule 2b is still clearly visibly spaced apart from the base element 7, the single-serve capsule 2a in FIG. 10b is already touching the base element 7 and the piercing element of the base element 7 has already pierced the base of the single-serve capsule 2a. Each further movement of the second brewing chamber element 4 in the horizontal direction 100 will therefore lead to the base element 7 being moved, as a result of which, in turn, the rotation of the first locking means 8 is brought about.

Figure 11:
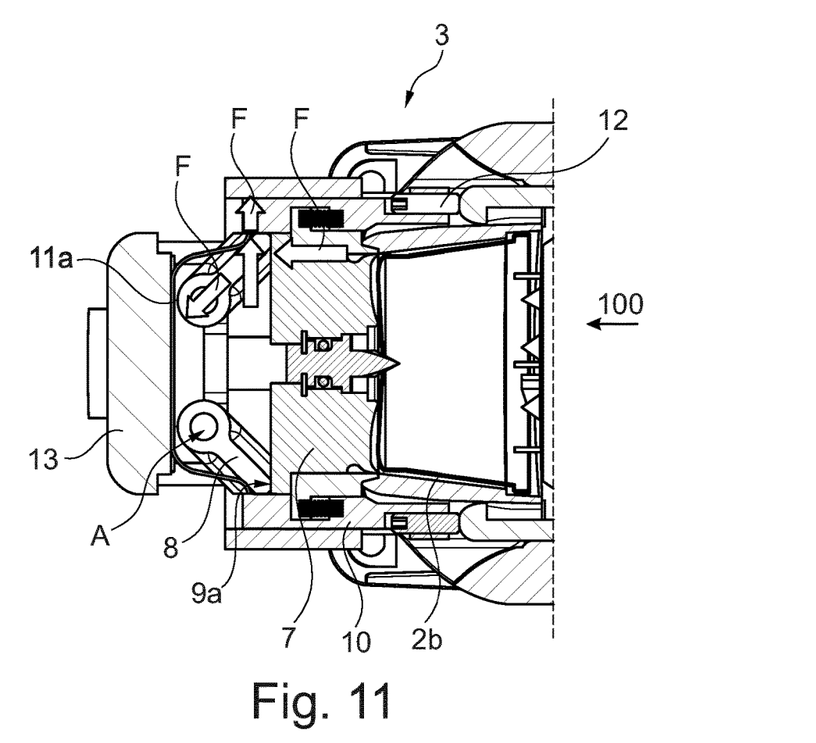
FIG. 11 shows a sectional illustration of a possible embodiment of a brewing apparatus according to the invention in the extraction position when a single-serve capsule of the second type is used, with an illustration of the forces which are in action.
Figure 12:
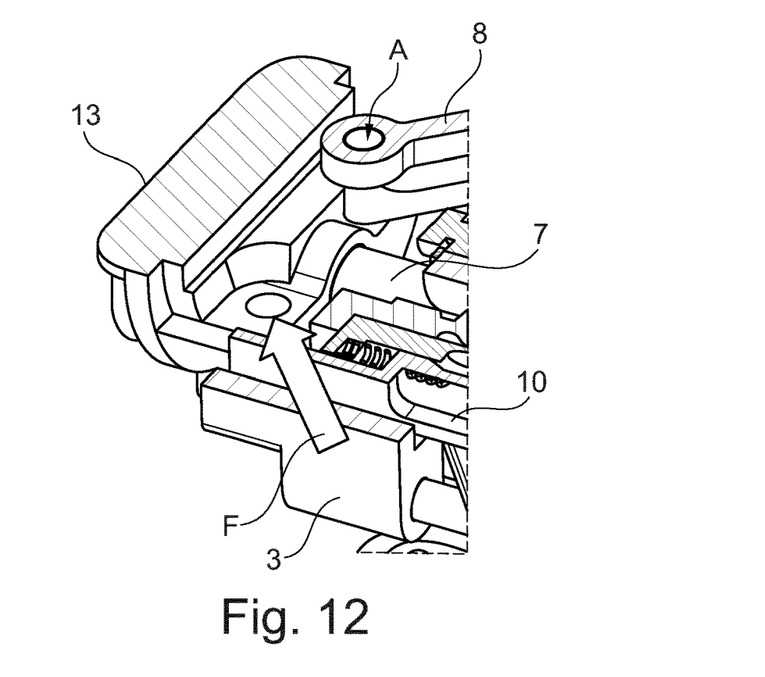
FIG. 12 shows a perspective detailed view of the embodiment according to FIG. 11 with an illustration of the forces which are in action.

FIG. 11 shows a sectional illustration of a possible embodiment of a brewing apparatus 1 according to the invention in the extraction position during use of a single-serve capsule of the second type 2b, with an illustration of the forces which are in action. The forces which are in action are symbolized by arrows. In the case of a small single-serve capsule 2b, said forces act on the base element 7 and are then dissipated firstly at the side of the first brewing chamber element 3 via the first locking means 8 and the contact surfaces 9c to the second locking means in the brewing apparatus 1 and from there to the housing of the beverage preparation apparatus. For this purpose, the contact surfaces 9a are correspondingly dimensioned. Secondly, they are dissipated via the obliquely positioned first locking means 8 to the rotation axle A or to the guide surface thereof. This is also illustrated in detail in FIG. 12.

Figure 13:
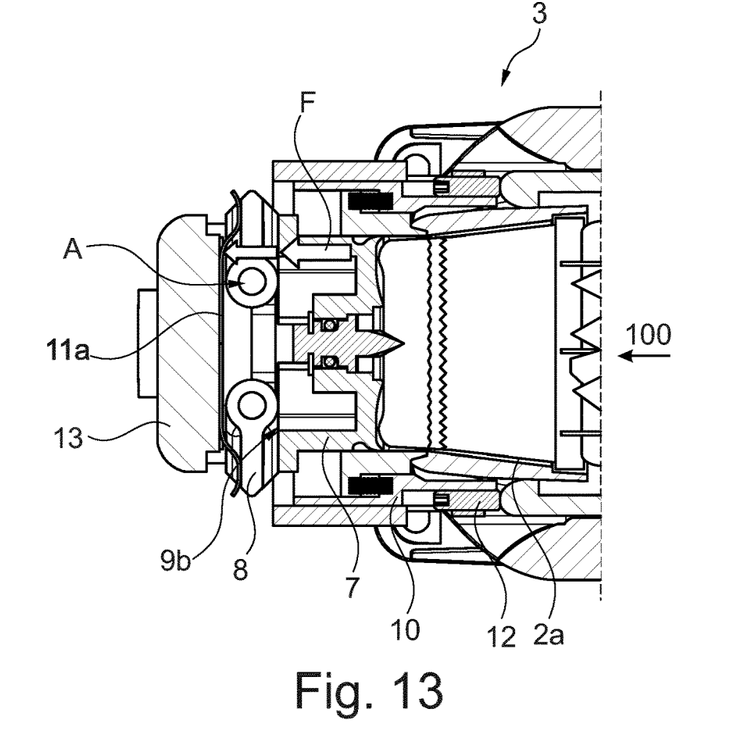
FIG. 13 shows a sectional illustration of a possible embodiment of a brewing apparatus according to the invention in the extraction position when a single-serve capsule of the first type is used, with an illustration of the forces which are in action.

FIG. 13 shows a sectional illustration of a possible embodiment of a brewing apparatus 1 according to the invention in the extraction position during use of a single-serve capsule of the first type 2a, with an illustration of the forces which are in action. The forces which are in action are again symbolized by arrows. In the case of the use of a larger single-serve capsule 2a, the forces are transmitted from the base element 7 via the contact surfaces 9b to the first locking means 8 and from there to the cover element 13. The forces are optionally transmitted from the cover element 13 into the housing of the beverage preparation apparatus.

Figure 14:
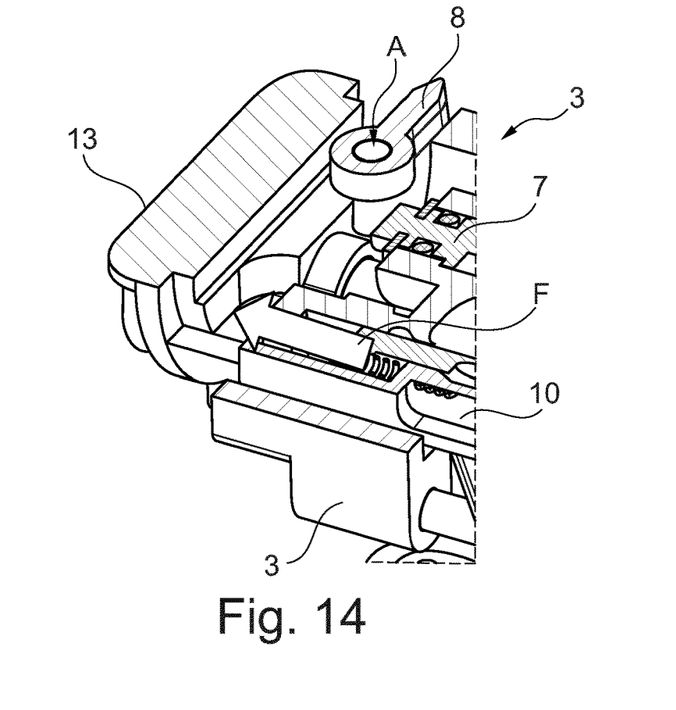
FIG. 14 shows a perspective detailed view of the embodiment according to FIG. 13 with an illustration of the forces which are in action.

FIG. 14 shows a perspective detailed view of the embodiment according to FIG. 13 with an illustration of the forces which are in action. In particular, the surface via which the force transmission from the first locking means 8 to the cover element 13 takes place can be seen here.

LIST OF REFERENCE SIGNS 1 brewing apparatus
2a, 2b single-serve capsule of first/second type
3 first brewing chamber element
4 second brewing chamber element
5 cavity
6 holding means
7 base element
8 first locking means
9a, 9b, 9c contact surface in starting position or second position
10 second locking means
11a, 11b, 11c first/second/third restoring means
12 adjustment means
13 cover element
100 horizontal direction
A rotation axis

The invention claimed is:

1. A beverage preparation apparatus having a housing and a brewing apparatus, which is arranged in said housing, for extracting a single-serve capsule, which contains a beverage substrate, of a first type and a second type, wherein the single-serve capsule of the first type has a greater axial length than the single-serve capsule of the second type, wherein the brewing apparatus comprises a first brewing chamber element and a second brewing chamber element, wherein the first brewing chamber element and the second brewing chamber element are movable relative to each other along a predetermined and horizontal path from a loading position, in which the first brewing chamber element and the second brewing chamber element are spaced apart from each other, into an extraction position, in which the first brewing chamber element and the second brewing chamber element form a substantially closed brewing chamber and in which a brewing operation can be carried out, wherein the first brewing chamber element comprises a cavity which is provided for receiving the single-serve capsule, wherein the cavity is delimited axially by a base element which is adjustable along a horizontal direction between a starting position and a second position, wherein the cavity has a greater volume in the second position than in the starting position, wherein the first brewing chamber element has a blocking apparatus which is actuable by the single-serve capsule or the second brewing chamber element, wherein the blocking apparatus is provided to block a movement of the base element in the horizontal direction away from the second brewing chamber element in the starting position or in the second position.

2. The beverage preparation apparatus as claimed in claim 1, wherein the blocking apparatus comprises at least one first locking means which is rotatable about an axis oriented perpendicularly to the horizontal direction or vertically, wherein a movement of the first locking means is blockable in the starting position and in the second position, wherein the first locking means in each case has a contact surface for the base element in the starting position and in the second position, wherein the contact surface in the starting position is different from the contact surface in the second position.

3. The beverage preparation apparatus as claimed in claim 2, wherein the blocking apparatus has two first locking means which are arranged mirror-symmetrically to a plane which is arranged between the first locking means and is parallel to the horizontal direction.

4. The beverage preparation apparatus as claimed in claim 2, wherein the first brewing chamber element has at least one second locking means, wherein the second locking means is provided so as to be movable horizontally along a predetermined path, wherein, when the single-serve capsule of the second type is used, the second locking means is provided so as to interact with the first locking means in such a manner that it blocks the first locking means in the starting position.

5. The beverage preparation apparatus as claimed in claim 4, wherein the second brewing chamber element has at least one holding means for holding and guiding the single-serve capsule, and wherein the second locking means is actuable by the second brewing chamber element by the holding means.

6. The beverage preparation apparatus as claimed in claim 2, wherein when the single-serve capsule of the first type is used, the first locking means is provided so as to interact with the base element in such a manner that the first locking means is brought from the starting position into the second position, wherein the first locking means is blocked in the second position.

7. The beverage preparation apparatus as claimed in claim 6, wherein the first locking means is blocked in the second position by the housing, the first brewing chamber element, the base element, or a second locking means.

8. The beverage preparation apparatus as claimed in claim 2, wherein the first locking means is prestressed in a direction of the base element by a first restoring means, wherein a second locking means is prestressed in a direction of the second brewing chamber element by a second restoring means, or wherein the base element is prestressed in a direction of the starting position by a third restoring means.

9. The beverage preparation apparatus as claimed in claim 8, wherein the first restoring means is a leaf spring.

10. The beverage preparation apparatus as claimed in claim 8, wherein the second restoring means is a spiral spring.

11. The beverage preparation apparatus as claimed in claim 8, wherein the third restoring means is a spiral spring.

12. The beverage preparation apparatus as claimed in claim 2, wherein the blocking apparatus has an adjustment means.

13. The beverage preparation apparatus as claimed in claim 12, wherein the blocking apparatus is a second locking means.

14. The beverage preparation apparatus as claimed in claim 2, wherein a main plane of extent of the first locking means encloses an angle of 45° to the horizontal in the starting position www/or encloses an angle of 90° to the horizontal in the second position.

15. A system for preparing a beverage, comprising the beverage preparation apparatus as claimed in claim 1 and a single-serve capsule set comprising at least one single-serve capsule of a first type and at least one single-serve capsule of a second type, wherein the single-serve capsule of the first type has a greater axial length than the single-serve capsule of the second type, wherein the beverage preparation apparatus comprises a housing and a brewing apparatus, which is arranged in said housing, for extracting the single-serve capsule, which contains a beverage substrate, of the first type and the second type, wherein the brewing apparatus comprises a first brewing chamber element and a second brewing chamber element, wherein the first brewing chamber element and the second brewing chamber element are movable relative to each other along a predetermined and horizontal path from a loading position, in which the first brewing chamber element and the second brewing chamber element are spaced apart from each other, into an extraction position, in which the first brewing chamber element and the second brewing chamber element form a closed brewing chamber and in which a brewing operation can be carried out, wherein the first brewing chamber element comprises a cavity which is provided for receiving the single-serve capsule, wherein the cavity is delimited axially by a base element which is adjustable along a horizontal direction between a starting position and a second position, wherein the cavity has a greater volume in the second position than in the starting position, wherein the first brewing chamber element has a blocking apparatus which is actuable by the single-serve capsule or the second brewing chamber element, wherein the blocking apparatus is provided to block a movement of the base element in the horizontal direction away from the second brewing chamber element in the starting position or in the second position.

16. A method for preparing a beverage using a single-serve capsule, which contains a beverage substrate, of a first type or a second type, wherein the single-serve capsule of the first type has a greater axial length than the single-serve capsule of the second type, in a beverage preparation apparatus having a housing and a brewing apparatus, which is arranged in said housing, for extracting the single-serve capsule, which contains the beverage substrate, of the first type and the second type, wherein the brewing apparatus comprises a first brewing chamber element and a second brewing chamber element, wherein the first brewing chamber element and the second brewing chamber element are movable relative to each other along a predetermined and horizontal path from a loading position, in which the first brewing chamber element and the second brewing chamber element are spaced apart from each other, into an extraction position, in which the first brewing chamber element and the second brewing chamber element form a closed brewing chamber and in which a brewing operation can be carried out, wherein the first brewing chamber element comprises a cavity which is provided for receiving the single-serve capsule wherein the cavity is delimited axially by a base element which is adjustable along a horizontal direction between a starting position and a second position, wherein the cavity has a greater volume in the second position than in the starting position, wherein the first brewing chamber element has a blocking apparatus which is actuable by the single-serve capsule or the second brewing chamber element, wherein the blocking apparatus is provided to block a movement of the base element in the horizontal direction away from the second brewing chamber element in the starting position or in the second position, wherein, in the loading position, the single-serve capsule is introduced into the beverage preparation apparatus, wherein the brewing apparatus is transferred into the extraction position, wherein:

when the single-serve capsule of the first type is used, the base element is transferred by the single-serve capsule from the starting position into the second position, and the movement of the base element in the horizontal direction is blocked in the second position, when the single-serve capsule of the second type is used, the blocking apparatus is actuated by the second brewing chamber element in such a manner that the movement of the base element from the starting position into the second position is blocked, wherein, in the extraction position, a liquid is conducted under pressure through the single-serve capsule, wherein the finished beverage is discharged through the base element and output through an outlet opening.

17. The method as claimed in claim 16, wherein, when the single-serve capsule of the second type is used, a holding means actuates a second locking means which blocks a first locking means in the starting position.

18. The method as claimed in claim 16, wherein the blocking apparatus is actuated by the second brewing chamber element by a holding means for holding and guiding the single-serve capsule.

* * * * *